April 15, 1958
A. A. KASSEL
2,830,518
DEPTH CONTROL UNIT FOR TRACTOR SUPPORTED
EARTH ENGAGING IMPLEMENTS
Filed March 14, 1956
3 Sheets-Sheet 2
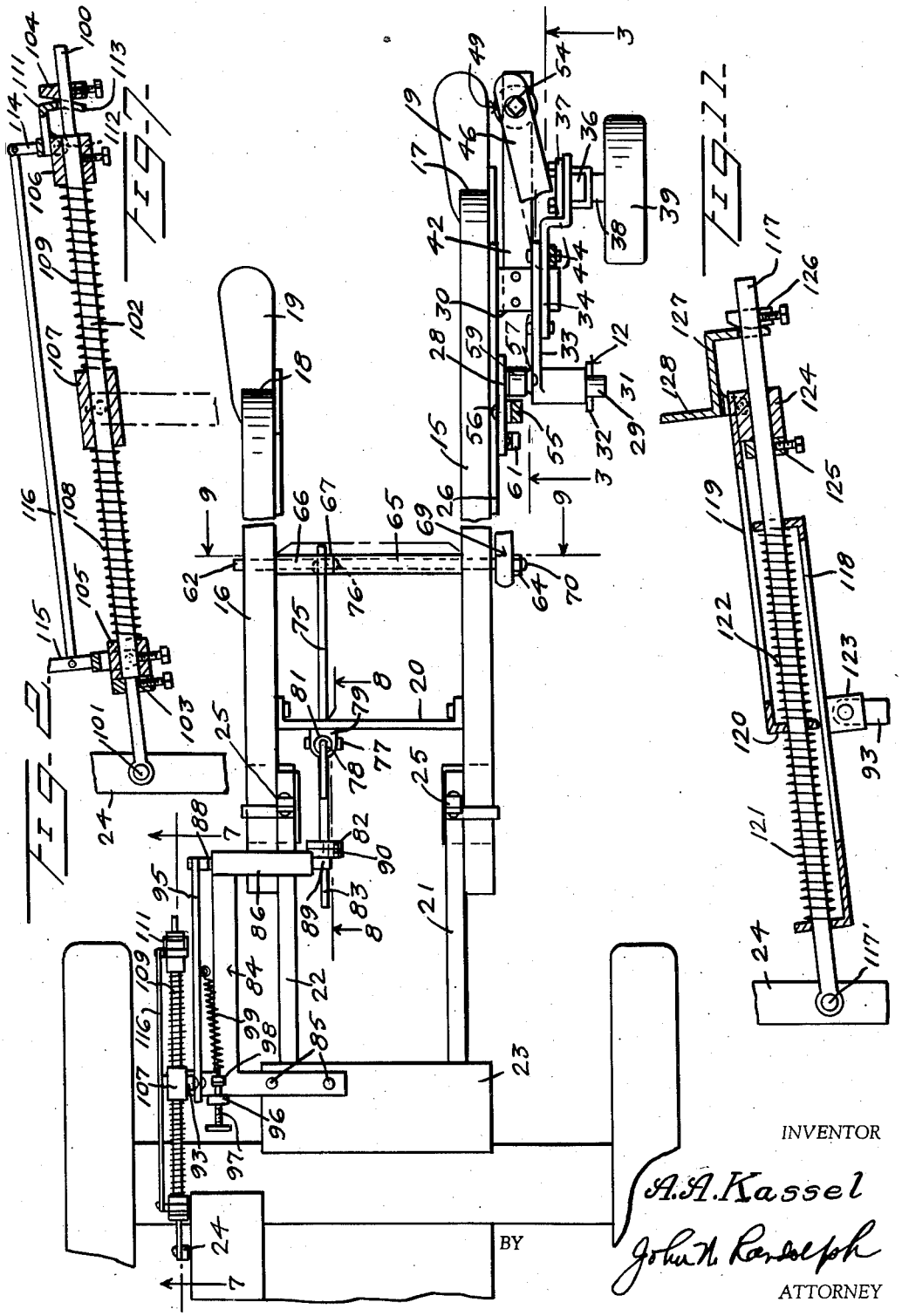
INVENTOR
A. A. Kassel
BY John N. Randolph
ATTORNEY

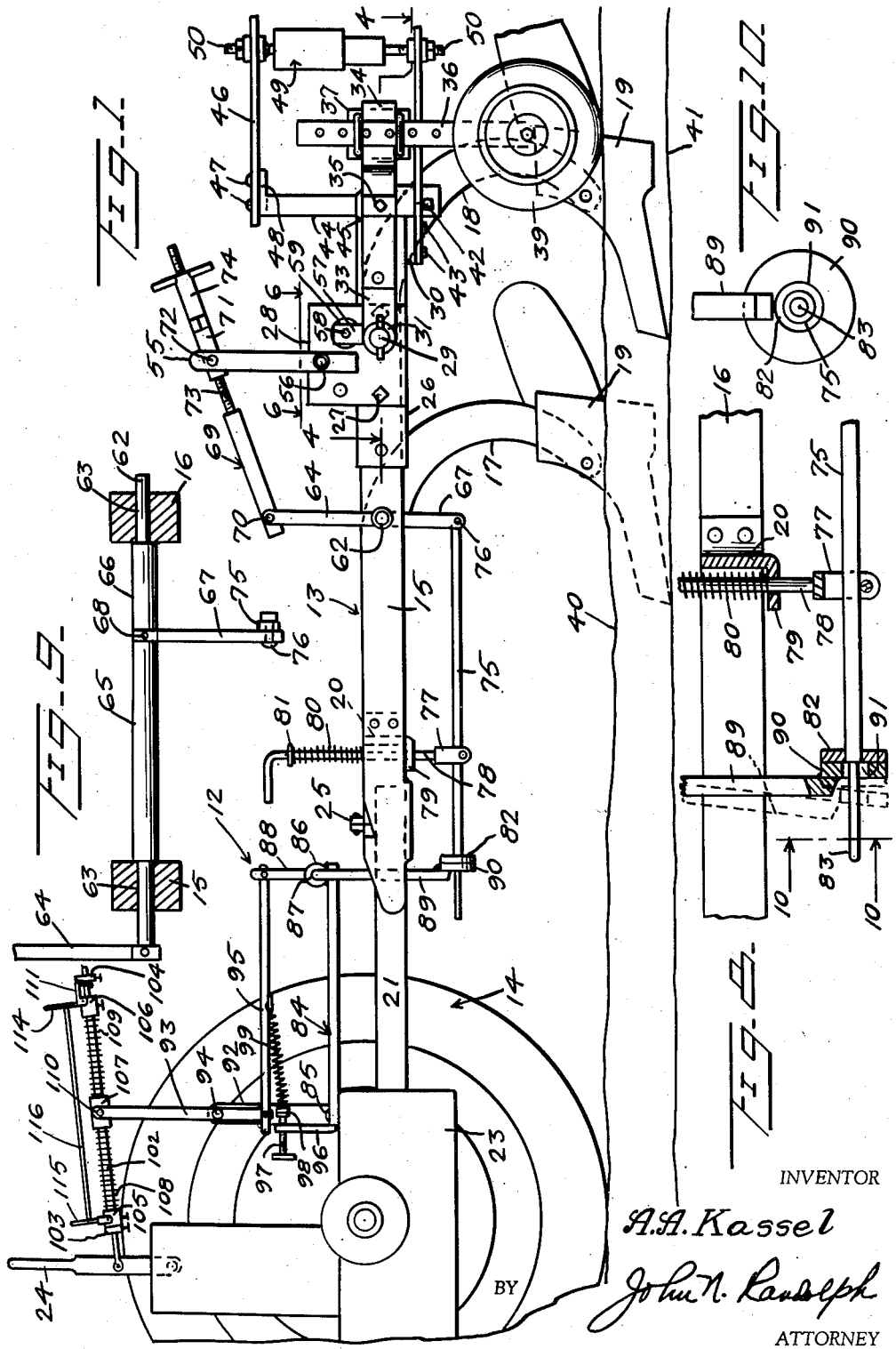

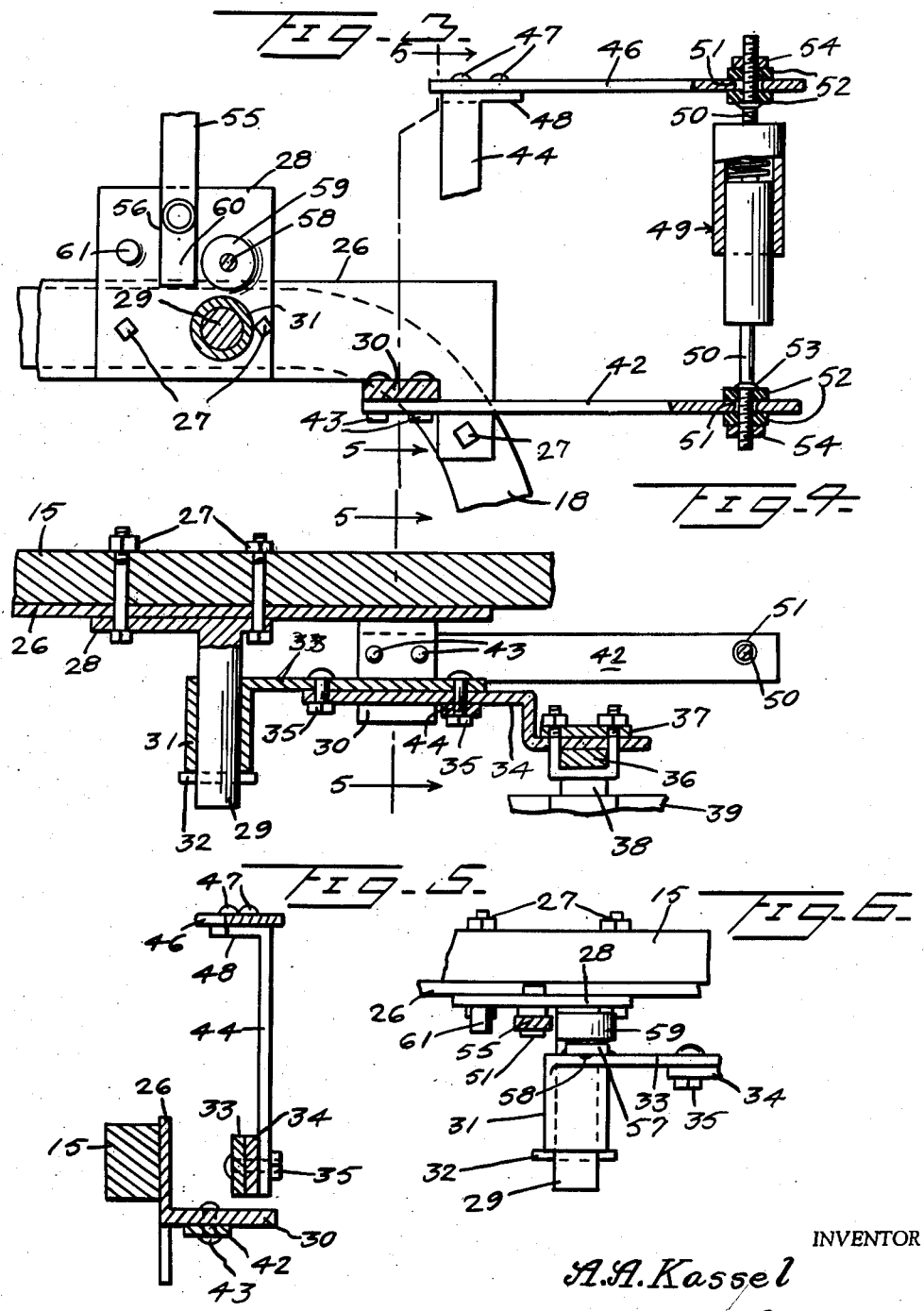

United States Patent Office 2,830,518
Patented Apr. 15, 1958

2,830,518

DEPTH CONTROL UNIT FOR TRACTOR SUPPORTED EARTH ENGAGING IMPLEMENTS

Arthur A. Kassel, Perryville, Mo.

Application March 14, 1956, Serial No. 571,483

7 Claims. (Cl. 97—46.03)

This invention relates to a novel unit for automatically controlling the depth of operation of earth engaging elements of farm implements which are supported by a direct connection to the arms of the hydraulic lift mechanism of a tractor in such a manner as to swing upwardly and downwardly in unison with said lift arms, for automatically maintaining the earth engaging elements of the implement at proper operating depth.

More particularly, it is an aim of the present invention to provide an automatic control unit which is operated solely in response to up and down movement of a gauge wheel which has contact with the earth but which does not support the weight of the implement, so that the weight of the implement and the draft thereof will effectively function to maintain proper traction on the rear wheels of the tractor.

A further object of the invention is to provide a depth control unit including a portion supported by the tractor and a portion supported by the implement and wherein a novel connection is provided between said portions which will not interfere with or delay connecting the implement to the tractor or disconnecting it therefrom.

Still a further object of the invention is to provide a novel connection between the tractor supported depth control portion and the implement supported portion which will not be affected by up and down or lateral displacement of the implement.

Still another object of the invention is to provide a depth control having novel means for cushioning the motion of the earth engaging element thereof whereby movement of said element over humps or depressions in the ground will not produce an operation of the hydraulic lift mechanism.

Still another object of the invention is to provide an automatic depth control unit including cushioning means interposed in the connection thereof to the hydraulic lift mechanism to prevent damage to the lift mechanism if the unit is improperly assembled therewith and to permit manual operation of the lift mechanism while connected to the automatic control unit.

Various other objects and advantages of the invention will hereinafter become more fully apparent from the following description of the drawings, illustrating presently preferred embodiments thereof, and wherein:

Figure 1 is a side elevational view including a portion of the rear end of a conventional tractor, a farm implement directly connected thereto, and showing the automatic depth control unit in an applied position supported partially by the implement and partially by the tractor;

Figure 2 is a top plan view, partly broken away, of the parts as seen in Figure 1;

Figure 3 is an enlarged fragmentary vertical sectional view, taken substantially along a plane as indicated by the line 3—3 of Figure 2;

Figure 4 is an enlarged fragmentary horizontal sectional view, taken substantially along a plane as indicated by the line 4—4 of Figure 1;

Figure 5 is a fragmentary transverse sectional view, taken substantially along a plane as indicated by the lines 5—5 of Figures 3 and 4;

Figure 6 is an enlarged fragmentary horizontal sectional view, taken substantially along a plane as indicated by the line 6—6 of Figure 1;

Figure 7 is an enlarged fragmentary longitudinal sectional view taken substantially along a plane as indicated by the line 7—7 of Figure 2;

Figure 8 is an enlarged fragmentary longitudinal sectional view taken substantially along a plane as indicated by the line 8—8 of Figure 2;

Figure 9 is an enlarged detailed cross sectional view taken substantially along a plane as indicated by the line 9—9 of Figure 2;

Figure 10 is an enlarged fragmentary cross sectional view, taken substantially along a plane as indicated by the line 10—10 of Figure 8, and Figure 11 is a view similar to Figure 7 but showing a modification of the invention.

Referring more specifically to the drawings, in order to illustrate the application and use of the automatic depth control unit, designated generally 12 and comprising the invention, a conventional tractor drawn farm implement 13 and a rear portion of a conventional tractor 14 has been partially illustrated.

The implement 13 is shown as consisting of two longitudinally extending transversely spaced beams 15 and 16 which have downwardly curved rear ends 17 and 18, respectively, to which are connected earth engaging implements, herein illustrated as conventional furrow openers 19. The beams 15 and 16 are connected to one another, near to but spaced from their forward ends, by a cross brace 20.

The rear portion of the tractor 14 includes a pair of rearwardly extending lift arms 21 and 22 forming a part of a conventional hydraulic lift mechanism 23 of the tractor. Said lift mechanism 23 is normally controlled manually by an upstanding lever 24 which is pivotally mounted at its lower end to swing forwardly and rearwardly of the tractor and which when moved forwardly functions in a conventional manner to cause the arms 21 and 22 to be swung upwardly in unison, and which lever 24 can be swung rearwardly for actuating the mechanism 23 to cause the arms 21 and 22 to be swung downwardly. The forward ends of the beams 15 and 16 are disposed in overlapping relation to the rear ends of the arms 21 and 22, respectively, and said overlapping ends of the complementary arms and beams are provided with suitable coupling means, designated generally 25, for detachably coupling the overlapping portions of the arms and beams rigidly to one another so that the beams and consequently the implement 13 will swing vertically in unison with the arms 21 and 22. The parts 13 to 25, inclusive, are all of conventional construction and have been illustrated and briefly described merely to afford a better understanding of the mounting and operation of the depth control unit 12.

Said unit 12 includes a mounting plate 26 which is supported by the implement 13 and which is shown detachably secured to the rear portion of the beam 15 thereof by nut and bolt fastenings 27. A plate 28 is secured by two or more of the fastenings 27 against a vertical side of the plate 26. A stub shaft 29 projects outwardly from a lower portion of the plate 28 and is disposed with its axis in substantially a horizontal plane and crosswise of the longitudinal axis of the beam 15 and implement 13. The mounting plate 26 has a rigid stop member 30 extending laterally therefrom in a direction away from the beam 15 and which is disposed in substantially a horizontal plane, rearwardly with respect to the stub shaft 29 and below the level thereof, as seen in Figure 3.

A sleeve 31 is journalled on the stub shaft 29 and is retained in engagement therewith by a pin 32 which extends through the stub shaft 29. An arm extends rearwardly from and is swingably supported by the sleeve 31, said arm including a forward section 33 and a rear section 34. The arm sections 33 and 34 have adjacent overlapping ends which are fastened together by longitudinally spaced nut and bolt fastenings 35. Said overlapping connecting portions of the arm sections are disposed directly over the stop 30 which limits the downward swinging movement of said arm 33, 34.

A standard 36 is secured by a clamp unit 37 to the rear end of the arm section 34 and crosswise thereof, so that the standard 36 is normally disposed vertically. The lower end of the standard 36 has an outwardly extending stub axle 38 on which a gauge wheel 39 is journalled and disposed in laterally spaced relation to the adjacent beam end 18 and the furrow opener 19 thereof. It will be readily obvious that the standard 36 can be adjustably connected by the clamp unit 37 to the arm portion 34 so that the overlapping portions of the arm sections will be positioned a desired distance above the stop 30 when the gauge wheel 39 is disposed to engage the ground and when the furrow openers 19 are operating at a desired depth below the ground level 40 to open a furrow 41 of a desired depth.

A bottom supporting bar 42 has its forward end fastened to the stop 30 by fastenings 43. The bar 42 extends rearwardly from the stop 30 and is laterally spaced from the rear arm portion 34. A supporting standard 44 has a lower end secured to the outer side of the arm section 34 by the rear fastening 35, as best seen in Figure 4. The standard 44 has a flange 45 which bears against the upper edge of the arm section 34 to cooperate with the rear fastening 35 to secure said standard rigidly to the arm 33, 34. An upper bar 46 has a forward end secured by fastenings 47 to a flanged upper end 48 of the standard 44 and is thus supported in substantially a horizontal plane or parallel to the arm 33, 34.

A conventionl shock absorber 49 is disposed between the rear ends of the bars 42 and 46 and has threaded rods 50 fixed to and extending from the ends thereof. Said rods 50 are disposed in alignment and extend loosely through openings 51 which are formed in the rear end portions of the bars 42 and 46. A pair of rubber washers 52 is mounted on each rod 50. Said washers are disposed above and beneath the bar through which the rod extends and between a fixed collar 53 of said rod 50 and a nut 54. The collars 53 of the rods 50 are disposed between the washers 52 of the rod individual thereto and the adjacent end of the shock absorber 49, and the nuts 54 are threaded onto the extremities of the rods 50 to retain the washers in applied positions, as seen in Figure 3. The shock absorber 49 is of a conventional type which will yieldably extend or retract so as to permit the bar 46 to swing toward or away from the bar 42 and to yieldably resist said swinging movement of the bar 46 in either direction.

A lever 55 is pivotally mounted on a pin 56 near to but spaced from its lower end. The pin 56 projects from the upper portion of the plate 28 to swingably mount the lever 55 above the stub shaft 29. The arm section 33, adjacent the sleeve 31, has a lateral upstanding extension 57 from which projects a pin 58 on which a roller 59 is journalled, between said extension 57 and a portion of the plate 28. As best seen in Figure 3, the axis of the roller is disposed rearwardly of the lower portion of the lever 55 and below the axis of the pin 56, about which said level springs. Thus, when the arm 33, 34 is swung upwardly from its normal position of Figure 1, a portion of the periphery of the roller 59 will engage an adjacent edge portion 60 of the lever 55 below the level of the pin 56, to cause the lever 55 to swing clockwise, as seen in Figures 1 and 3. This clockwise swinging movement causes the upper portion of the lever 55 to be swung rearwardly. The edge portion 60 thus constitutes a cam surface which is disposed to be engaged by the roller 59. A stop 61 projects from the plate 28 in the path of clockwise swinging movement of the lower end of the lever 55, to limit the extent that the lever 55 can swing clockwise.

As best seen in Figure 9, a shaft 62 extends through and is journalled in openings 63 of the beams 15 and 16. A lever 64 is fixed to and extends upwardly from the shaft 62, outwardly with respect to the beam 15. Spacing sleeves 65 and 66 are disposed loosely on the shaft 62 between the beams 15 and 16, and one end of a lever 67 is fixed to the shaft 62, between the spacing sleeves 65 and 66, by a setscrew 68. The lever 67 extends downwardly from the shaft 62 and is disposed nearer the beam 16 than the beam 15. The shaft 62 is disposed forwardly of the lever 55 but rearwardly with respect to the cross brace 20.

As best illustrated in Figure 1, a link 69 is pivotally connected at 70 at its forward end to the upper end of the lever 64 and extends upwardly and rearwardly therefrom. A sleeve 71 is pivotally connected by a pivot element 72 to the upper portion of the lever 55. The link 69 has a restricted threaded stem 73 constituting the rear end thereof which extends loosely through the sleeve 71. A nut 74 is adjustably mounted on the stem 73, rearwardly of the sleeve 71, to be engaged by said sleeve, when the lever 55 is rocked clockwise as seen in Figure 1 and as previously described, to cause a rearward pull to be exerted on the link 69 for turning the levers 64 and 67 and the shaft 62 in the same direction or clockwise.

A rod 75 has its rear end pivotally connected at 76 to the lower end of the lever 67 and extends forwardly therefrom. Thus, when said levers are swung clockwise as previously described, a forward push from right to left of Figure 1 will be exerted on the push rod 75. The intermediate portion of the rod 75 extends loosely through and is supported by a loop 77 which is attached to the lower end of a rod 78. Said rod 78 extends upwardly through and is slidably disposed in the opening of a horizontal bracket 79 which extends forwardly from a portion of the cross brace 20, as best illustrated in Figure 8. A spring 80 of the compression type is disposed around a portion of the hanger rod 78 and has a lower end resting on the guide 79 and an upper end bearing against a collar 81, fixed to the rod 78, for normally retaining the loop 77 in a position to support the push rod 75 substantially parallel to the plane of the beams 15 and 16. A disk 82 is fixed to the forward end of the rod 75, forwardly of the loop 77, and said rod has a stem 83 of restricted diameter extending forwardly from the disk 82 and which has a rounded terminal.

A bracket, designated generally 84, is suitably secured by a fastening 85 to a portion of the housing of the tractor mechanism 23. The bracket 84 has a transversely disposed bearing portion 86 defining the rear end thereof. As seen in Figures 1 and 2, a crankshaft 87 is journalled in the bearing 86 and has an upwardly extending crank arm 88 disposed beyond the outer end of the bearing 86, and a downwardly extending crank arm 89, which extends downwardly beyond the inner end of the bearing 86, between the overlapping portions of the beams 15 and 16 and the lift arms 21 and 22. A disk 90 is fixed to the lower end of the crank arm 89 and is disposed in a vertical plane crosswise of the push rod 75 and has a large opening 91, as seen in Figure 10, through which the stem 83 loosely extends. The forward side of the disk 82 normally bears against the rear face of the disk 90, as clearly illustrated in Figures 1 and 2.

The bracket 84 includes an upstanding post 92 which is disposed forwardly of the bearing 86. A lever 93 is swingably mounted on the post 92 by a pivot pin 94 for swinging movement in substantially a vertically plane longitudinally of the implement and tractor. The pivot 94 is located nearer the lower end than the upper end of the lever 93. A link 95 is pivotally connected to the upper portion of the crank arm 88 and to the lower portion of the lever 93.

The bracket 84 includes an upstanding part 96 through which is threaded a screw 97 having a swivel head 98 at the rear end thereof which is anchored to one end of a tension spring 99. The other end of the spring 99 is connected to the link 95 for urging said link to move forwardly or from right to left, as seen in Figure 1, to urge the lever 93 to swing clockwise and for urging the cranks 88 and 89 in a counterclockwise direction. Thus, the parts 96, 97 and 98 form an adjustable anchor for the forward end of the tension spring 99.

A rod 100 is pivotally connected at 101 at its forward end to the lever 24 above and spaced from the axis of swinging movement of said lever. The rod 100 extends rearwardly from the lever 24 and has a long tube 102 slidably mounted thereon. A collar 103 is adjustably secured to the rod 100 between the lever 24 and tube 102 and a collar 104 is adjustably secured to the rod 100 beyond the other end of the tube 102, as best seen in Figure 7. Collars 105 and 106 are detachably secured on the ends of the tube 102 adjacent the collars 103 and 104, respectively. A sleeve 107 is slidably disposed on the tube 102 between the collars 105 and 106. Compression springs 108 and 109 are disposed on the tube 102 between the collar 105 and the sleeve 107 and between the collar 106 and the sleeve 107, respectively. The sleeve 107 is normally maintained midway between the collars 105 and 106 by the springs 108 and 109. The upper end of the lever 93 is pivotally connected by a pin 110 to the intermediate portion of the sleeve 107, as seen in Figure 1.

A latch 111 is swingably mounted at 112 on the collar 106 and has a bifurcated or notched free end 113 which normally straddles the rod 100 and bears against the inner side of the collar 104 to retain the collar 106 spaced from said collar 104 and the collar 105 against the inner collar 103. A lever arm 114 is fixed to and projects laterally from the latch 111 and a lever 115 is pivotally connected to and extends laterally from the collar 105. The levers 114 and 115 are connected by a link 116 to swing in unison when either of said levers is actuated.

Figure 11 illustrates a modified form of the structure as shown in Figure 7, wherein a rod 117 has a forward end pivoted at 117' to the lever 24. Two elongated yoke members 118 and 119 have their end portions slidably engaging the rod 117 and are disposed in opposed offset relation to one another, so that one end 120 of the yoke 119 slidably engages the rod 117 between the ends of the yoke 118. Two compression springs 121 and 122 are loosely disposed on the rod 117 between the ends of the yoke 118 and the yoke end 120 is disposed between the adjacent ends of the springs 121 and 122. The upper end of the lever 93 is pivotally connected by a connection 123 to the outer side of the intermediate portion of the yoke 118. The other end 124 of the yoke 119 slidably engages the rod 117 beyond an outer rear end of the yoke 118 and is slidably disposed between collars 125 and 126 which are adjustably secured to the rod 117. A latch 127, corresponding to the latch 111, is swingably mounted on the yoke end 124 and has its bifurcated free end normally engaging the rod 117 and bearing against the inner side of the collar 126. The latch 127 has a lever arm 128 extending outwardly therefrom which is adapted to be manually operated for swinging the latch 127 counterclockwise from its position of Figure 11 out of engagement with the rod 117 and collar 126.

Assuming that the automatic depth control unit 12 is assembled on the implement 13 and tractor 14 as illustrated in the drawings and as previously described, it will be understood that the standard 36 may be readily adjusted by the clamp unit 37 relative to the arm section 34 so that the wheel 39 will have contact with the ground surface 40 when the furrow openers 19 are disposed at a desired depth, but so that none of the weight of the implement 13 will be supported by the gauge wheel 39. In this position of the parts, the arm 33, 34 will be disposed only slightly above the level of the stop 30. With the parts thus disposed, the tension spring 99 acting on the lever 24 through the lever 93 and the parts carried by the rod 100 will urge the lever 24 to swing rearwardly to actuate the hydraulic mechanism 23 so that a downward pressure will be exerted on the lift arms 21 and 22 for urging the implement 13 downwardly. However, if the depth of operation of the furrow openers 19 is increased to any appreciable extent, the gauge wheel 39 by contact with the ground 40 will be displaced upwardly to swing the arm 33, 34 counterclockwise about the stub shaft 29 as seen in Figure 1. This will cause the cam roller 59 to swing from right to left of Figure 1 against the lever surface 60 so that the roller 59 by a camming action with the surface 60 will cause the lever 55 to swing clockwise about its pivot 56 to thus exert a rearward pull on the link 69 to swing the crankshaft 62 and crankshafts 64 and 67 clockwise, as seen in Figure 1, to thus exert a forward or right to left thrust against the push rod 75. When this occurs, the disk 82 by contact with disk 90 will cause the crank 87 and the crank arms 88 and 89 to swing clockwise. The lever 93, being connected to the crank arm 88 by the link 95 will thus be swung counterclockwise as seen in Figure 1, to initially compress the spring 108 and to thereafter force the rod 100 to move from right to left to swing the lever 24 forwardly or counterclockwise so that the mechanism 23 will be actuated to raise the lift arms 21 and 22. In this manner, the operating depth of the implement parts 19 will be constantly maintained and corrected.

It will also be apparent that when the arm 33, 34 swings upwardly the post 44 and bar 46 will move upwardly therewith to effect an extension of the shock absorber 49 which will resist and cushion the upward travel of the parts. In a like manner, the shock absorber 49 will resist and delay downward swinging movement of the gauge wheel 39 so that said wheel will not bounce in passing over uneven surfaces of the ground 40 and which would otherwise produce a constant movement of the linkage system of the unit 12.

The springs 108 and 109 will absorb any slight vibratory movement of the lever 93 and sleeve 107 so that such movement will not be imparted to the lever 24 and will prevent an excessive movement of the lever 24 should the unit 12 be improperly assembled or adjusted.

The springs 108 and 109 also permit the lever 24 to be manually operated for either raising or lowering the lift arms 21 and 22 to a limited extent. An additional manual operation is made possible by actuating either lever 114 or 115 to swing the latch 111 upwardly from its position of Figure 7, so that the lever 24 will have an additional unobstructed movement through an arc corresponding to the distance between the parts 104 and 106, as seen in Figure 7. It will be readily apparent that the modification as illustrated in Figure 11 will perform in the same manner and accomplish the same result as the parts as shown in Figure 7.

By the simple expedient of uncoupling the beams 15 and 16 from the lift arms 21 and 22 in a conventional manner by releasing the latch means 25, the implement 13 can be disconnected from the tractor 14 by movement of the tractor away from the implement. The parts of the automatic depth control unit 12 which are supported by the bracket 84 will move with the tractor 14 away from the parts which are supported by the implement 13. As the implement 13 is again coupled to the lift arms 21 and 22, it is only necessary to manipulate the rod 78 slightly so that the stem 83 will enter the opening 91 for reconnecting the parts of the control 12 which are carried by the implement 13 to the parts thereof which are supported by the tractor 14. Furthermore, no adjustment of the linkage of the control 12, as a result of the uncoupling and re-coupling, will be required.

Additionally, the connection of the linkage system of the control 12 formed by the disks 82 and 90, the stem 83 and opening 91 provides a novel connection wherein slight up and down or lateral movement of the implement 13 relative to the tractor 14 will not be transmitted as a pull or thrust on the lever 93 through the link 95 and will produce no other movement of the linkage system.

Various modifications and changes are contemplated and may obviously be resorted to, without departing from the function or scope of the invention as hereinafter defined by the appended claims.

I claim as my invention:

1. An automatic depth control comprising a mounting structure adapted to be secured to a frame portion of an implement having at least one earth engaging part adapted to be drawn through the earth in a subsurface position, an arm swingably supported on said mounting structure, a gauge wheel adapted to engage and roll on the ground, means connecting said gauge wheel to said arm at a point spaced from the axis of swinging movement of the arm, a lever swingably supported by said mounting structure at a point spaced from the ends of said lever for swinging movement in a direction longitudinally of the implement, cam means extending from said arm and disposed to engage said lever between the arm and lever pivot when the arm is swung upwardly by upward displacement of the gauge wheel for causing said lever to swing in the opposite direction to said arm, link and lever means having one end adjustably connected to the upper end of said lever and an opposite end adapted to be connected to the control lever of a hydraulic lift mechanism of a tractor for exerting a forward thrust on the control lever to raise the lift arms of the lift mechanism to which the implement frame is coupled for raising the implement when said gauge wheel is displaced upwardly relative to the implement frame, a spring connected to and acting through the link and lever means for exerting a rearward pull on the control lever for lowering the lift arms and implement, a shock absorber for cushioning and dampening the up and down movement of the gauge wheel and arm, a rigid supporting member secured to a part of said mounting structure and connected to one end of said shock absorber, and a support secured to said arm and movable therewith and connected to the opposite end of said shock absorber.

2. An automatic depth control comprising a mounting structure adapted to be secured to a frame portion of an implement having at least one earth engaging part adapted to be drawn through the earth in a subsurface position, an arm swingably supported on said mounting structure, a gauge wheel adapted to engage and roll on the ground, means connecting said gauge wheel to said arm at a point spaced from the axis of swinging movement of the arm, a lever swingably supported by said mounting structure at a point spaced from the ends of said lever for swinging movement in a direction longitudinally of the implement, cam means extending from said arm and disposed to engage said lever between the arm and lever pivot when the arm is swung upwardly by upward displacement of the gauge wheel for causing said lever to swing in the opposite direction to said arm, link and lever means having one end adjustably connected to the upper end of said lever and an opposite end adapted to be connected to the control lever of a hydraulic lift mechanism of a tractor for exerting a forward thrust on the control lever to raise the lift arms of the lift mechanism to which the implement frame is coupled for raising the implement when said gauge wheel is displaced upwardly relative to the implement frame, a spring connected to and acting through the link and lever means for exerting a rearward pull on the control lever for lowering the lift arms and implement, comprising a bracket adapted to be supported by a part of the tractor and supporting a portion of the link and lever means, the remainder of said link and lever means being supported by the implement, and means forming a connection between the bracket supporting portion and implement supported portion of said link and lever means whereby said portions are disconnected by movement of the bracket supported portion away from the implement supported portion and connected by movement of the bracket supported portion toward the implement supported portion.

3. An automatic depth control comprising a mounting structure adapted to be secured to a frame portion of an implement having at least one earth engaging part adapted to be drawn through the earth in a subsurface position, an arm swingably supported on said mounting structure, a gauge wheel adapted to engage and roll on the ground, means connecting said gauge wheel to said arm at a point spaced from the axis of swinging movement of the arm, a lever swingably supported by said mounting structure at a point spaced from the ends of said lever for swinging movement in a direction longitudinally of the implement, cam means extending from said arm and disposed to engage said lever between the arm and lever pivot when the arm is swung upwardly by upward displacement of the gauge wheel for causing said lever to swing in the opposite direction to said arm, link and lever means having one end adjustably connected to the upper end of said lever and an opposite end adapted to be connected to the control lever of a hydraulic lift mechanism of a tractor for exerting a forward thrust on the control lever to raise the lift arms of the lift mechanism to which the implement frame is coupled for raising the implement when said gauge wheel is displaced upwardly relative to the implement frame, a spring connected to and acting through the link and lever means for exerting a rearward pull on the control lever for lowering the lift arms and implement, said link and lever system including a link pivotally connected to the control lever and to which an end of a lever of the link and lever system is slidably connected, cushioning springs carried by said link and between which said lever end is disposed to permit a limited movement of said lever end relative to said link and the control lever.

4. An automatic depth control comprising a mounting structure adapted to be secured to a frame portion of an implement having at least one earth engaging part adapted to be drawn through the earth in a subsurface position, an arm swingably supported on said mounting structure, a gauge wheel adapted to engage and roll on the ground, means connecting said gauge wheel to said arm at a point spaced from the axis of swinging movement of the arm, a lever swingably supported by said mounting structure at a point spaced from the ends of said lever for swinging movement in a direction longitudinally of the implement, cam means extending from said arm and disposed to engage said lever between the arm and lever pivot when the arm is swung upwardly by upward displacement of the gauge wheel for causing said lever to swing in the opposite direction to said arm, link and lever means having one end adjustably connected to the upper end of said lever and an opposite end adapted to be connected to the control lever of a hydraulic lift mechanism of a tractor for exerting a forward thrust on the control lever to raise the lift arms of the lift mechanism to which the implement frame is coupled for raising the implement when said gauge wheel is displaced upwardly relative to the implement frame, a spring connected to and acting through the link and lever means for exerting a rearward pull on the control lever for lowering the lift arms and implement, said link and lever means including a link connecting a lever thereof to the control lever, cushioning spring means carried by said link and acting upon the connection of said link to the lever to permit a limited movement of said lever relative to said link and the control lever and a latch structure associated with said link and releasable to permit an additional limited movement of said link and the control lever relative to said lever of the link and lever means for manual operation of the hydraulic lift mechanism.

5. An automatic depth control comprising a mounting structure adapted to be secured to a frame portion of an implement having at least one earth engaging part adapted to be drawn through the earth in a subsurface position, an arm swingably supported on said mounting structure, a gauge wheel adapted to engage and roll on the ground, means connecting said gauge wheel to said arm at a point spaced from the axis of swinging movement of the arm, a lever swingably supported by said mounting structure at a point spaced from the ends of said lever for swinging movement in a direction longitudinally of the implement, cam means extending from said arm and disposed to engage said lever between the arm and lever pivot when the arm is swung upwardly by upward displacement of the gauge wheel for causing said lever to swing in the opposite direction to said arm, link and lever means having one end adjustably connected to the upper end of said lever and an opposite end adapted to be connected to the control lever of a hydraulic lift mechanism of a tractor for exerting a forward thrust on the control lever to raise the lift arms of the lift mechanism to which the implement frame is coupled for raising the implement when said gauge wheel is displaced upwardly relative to the implement frame, a spring connected to and acting through the link and lever means for exerting a rearward pull on the control lever for lowering the lift arms and implement, said link and lever means including a rear section adapted to be supported by said implement and a forward section, a bracket adapted to be supported by the tractor and supporting said forward section of the link and lever means, said rear section including a push rod, a disk fixed to a forward end of said push rod, said forward section including a depending crank arm mounted for swinging movement toward and away from said rear section, and a disk fixed to the lower end of said crank arm and disposed to bear against the forward side of said first mentioned disk.

6. An automatic depth control as in claim 5, said last mentioned disk having a relatively large opening, and a stem extending forwardly from the first mentioned disk loosely through said opening.

7. An automatic depth control as in claim 6, said push rod being pivotally supported at its rear end, a hanger, means adapted to yieldably suspend said hanger from a portion of the implement frame, and a loop supported by said hanger through which the intermediate portion of the push rod loosely extends for supporting the forward end of said push rod.

References Cited in the file of this patent

UNITED STATES PATENTS

| | | |
|---|---|---|
| 707,879 | Tinsman | Aug. 26, 1902 |
| 1,381,374 | Waterman | June 14, 1921 |
| 1,665,041 | Planess | Apr. 3, 1928 |
| 2,318,194 | Brown | May 4, 1943 |
| 2,406,484 | Allen | Aug. 27, 1946 |